US011398138B2

(12) United States Patent
Cuddy et al.

(10) Patent No.: US 11,398,138 B2
(45) Date of Patent: Jul. 26, 2022

(54) GAMING SYSTEM AND APPARATUS FOR CONSECUTIVE ASCENDING AWARDS

(71) Applicant: Aristocrat Technologies Australia Pty Limited, North Ryde (AU)

(72) Inventors: Ryan Cuddy, Reno, NV (US); Lyndsay Nelson, Reno, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

(21) Appl. No.: 17/069,564

(22) Filed: Oct. 13, 2020

(65) Prior Publication Data

US 2021/0027583 A1 Jan. 28, 2021

Related U.S. Application Data

(63) Continuation of application No. 14/867,786, filed on Sep. 28, 2015, now abandoned.

(51) Int. Cl.
*G07F 17/32* (2006.01)
*G06F 3/02* (2006.01)
*G06F 3/0488* (2022.01)

(52) U.S. Cl.
CPC ............ *G07F 17/3267* (2013.01); *G06F 3/02* (2013.01); *G06F 3/0488* (2013.01);
(Continued)

(58) Field of Classification Search
CPC ............ G07F 17/3267; G07F 17/3209; G07F 17/3213; G07F 17/3223; G07F 17/323;
(Continued)

(56) References Cited

U.S. PATENT DOCUMENTS 5,971,849 A 10/1999 Falciglia
6,146,271 A 11/2000 Kadlic
(Continued)

FOREIGN PATENT DOCUMENTS

AU 2004202643 B2 1/2005
AU 2007231800 B2 5/2012
(Continued)

OTHER PUBLICATIONS

Notice of Allowance dated Jun. 4, 2020 for U.S. Appl. No. 16/100,851 (pp. 1-7).
(Continued)

*Primary Examiner* — Werner G Garner
(74) *Attorney, Agent, or Firm* — Armstrong Teasdale LLP (57) ABSTRACT

A gaming machine determines a base outcome and initiates a bonus display sequence including a plurality of bonus outcomes. Prior to displaying any of the bonus outcomes, the machine determines a quantity of free spins and an outcome for each free spin, including an outcome amount, and at least one additional free play outcome including a corresponding outcome amount. The machine identifies i) a plurality of winning outcomes and ii) a plurality of non-winning outcomes and sorts, in ascending order based on the outcome amount, the plurality of winning outcomes in a table stored in memory. The machine displays the winning outcomes in order retrieved from the table, and displays the at least one additional free play outcome when the corresponding outcome amount is equal to or greater than the respective free play outcome of the plurality of winning outcomes.

14 Claims, 4 Drawing Sheets

(52) U.S. Cl.
CPC ........ *G07F 17/323* (2013.01); *G07F 17/3209* (2013.01); *G07F 17/3213* (2013.01); *G07F 17/3223* (2013.01); *G07F 17/3246* (2013.01); *G07F 17/3286* (2013.01)

(58) Field of Classification Search
CPC .... G07F 17/3246; G07F 17/3286; G06F 3/02; G06F 3/0488
See application file for complete search history.

(56) References Cited

U.S. PATENT DOCUMENTS

| | | |
|---|---|---|
| 6,234,897 B1 | 5/2001 | Frohm |
| 6,299,165 B1 | 10/2001 | Nagano |
| 6,582,305 B1 | 6/2003 | Carter |
| 7,052,395 B2 | 5/2006 | Glavich |
| 7,097,560 B2 | 8/2006 | Okada |
| 7,166,028 B2 | 1/2007 | Fasbender |
| 7,300,351 B2 | 11/2007 | Thomas |
| 7,632,184 B2 | 12/2009 | Gauselmann |
| 7,704,137 B2 | 4/2010 | Englman |
| 7,740,245 B2 | 6/2010 | Tarantino |
| 7,749,072 B1 | 7/2010 | Singer |
| 7,846,018 B2 | 12/2010 | Baerlocher |
| 7,938,719 B2 | 5/2011 | Fasbender |
| 7,993,195 B2 | 8/2011 | Belger |
| 8,287,367 B2 | 10/2012 | Hall |
| 8,323,094 B2 | 12/2012 | Palermo |
| 8,454,429 B2 | 6/2013 | Jaffe |
| 8,506,380 B2 | 8/2013 | Hughes |
| 8,506,386 B2 | 8/2013 | Harris |
| 8,696,436 B2 | 4/2014 | Acres |
| 8,708,806 B2 | 4/2014 | Wabschall |
| 9,017,160 B2 | 4/2015 | Moroney |
| 9,064,383 B2 | 6/2015 | Palermo |
| 9,728,043 B2 | 8/2017 | Acres |
| 9,959,708 B2 | 5/2018 | Caputo |
| 2002/0010016 A1 | 1/2002 | Tsukahara |
| 2002/0086725 A1 | 7/2002 | Fasbender |
| 2002/0155880 A1 | 10/2002 | Glavich |
| 2003/0032470 A1 | 2/2003 | Weiss |
| 2003/0060276 A1 | 3/2003 | Walker |
| 2003/0064797 A1 | 4/2003 | Jackson |
| 2003/0114217 A1 | 6/2003 | Walker |
| 2003/0125100 A1 | 7/2003 | Cannon |
| 2003/0236118 A1 | 12/2003 | Okada |
| 2004/0023709 A1 | 2/2004 | Beaulieu |
| 2004/0033827 A1 | 2/2004 | Gilmore |
| 2004/0053666 A1 | 3/2004 | Vancura |
| 2004/0082384 A1 | 4/2004 | Walker |
| 2004/0087360 A1 | 5/2004 | Chamberlain |
| 2004/0242320 A1 | 12/2004 | Jackson |
| 2004/0259627 A1 | 12/2004 | Walker |
| 2004/0266516 A1 | 12/2004 | Thomas |
| 2005/0060050 A1 | 3/2005 | Baerlocher |
| 2005/0075156 A1 | 4/2005 | Seelig |
| 2005/0075163 A1 | 4/2005 | Cuddy |
| 2006/0068903 A1 | 3/2006 | Walker |
| 2006/0079313 A1 | 4/2006 | Trainor |
| 2006/0111172 A1 | 5/2006 | Walker |
| 2006/0199634 A1 | 9/2006 | Anderson |
| 2006/0223632 A1 | 10/2006 | Walker |
| 2006/0244211 A1 | 11/2006 | Osawa |
| 2006/0247006 A1 | 11/2006 | Inamura |
| 2006/0247007 A1 | 11/2006 | Inamura |
| 2007/0167211 A1 | 7/2007 | Rodgers |
| 2007/0202943 A1 | 8/2007 | Thomas |
| 2007/0293297 A1 | 12/2007 | Schugar |
| 2008/0102916 A1 | 5/2008 | Kovacs |
| 2008/0108431 A1 | 5/2008 | Cuddy |
| 2008/0113734 A1 | 5/2008 | Watkins |
| 2008/0113777 A1 | 5/2008 | Anderson |
| 2008/0318656 A1 | 12/2008 | Walker |
| 2009/0017897 A1 | 1/2009 | Fujimoto |
| 2009/0124332 A1 | 5/2009 | Baerlocher |
| 2009/0124346 A1 | 5/2009 | Baerlocher |
| 2009/0197664 A1 | 8/2009 | Schultz |
| 2009/0200740 A1 | 8/2009 | Falciglia, Sr. |
| 2009/0239601 A1 | 9/2009 | Macke |
| 2009/0275387 A1 | 11/2009 | Yoshizawa |
| 2010/0029364 A1 | 2/2010 | Zielinski |
| 2010/0056248 A1 | 3/2010 | Acres |
| 2010/0120492 A1 | 5/2010 | Davis |
| 2010/0120525 A1 | 5/2010 | Baerlocher |
| 2010/0137056 A1 | 6/2010 | Hoffman |
| 2011/0059791 A1 | 3/2011 | Tarantino |
| 2011/0118001 A1 | 5/2011 | Vann |
| 2011/0118006 A1 | 5/2011 | Acres |
| 2011/0124400 A1 | 5/2011 | Scholtz |
| 2011/0244935 A1 | 10/2011 | Matthews |
| 2011/0269548 A1 | 11/2011 | Barclay |
| 2012/0034967 A1 | 2/2012 | Owen |
| 2012/0061150 A1 | 3/2012 | Coulombe |
| 2012/0122543 A1 | 5/2012 | Watkins |
| 2012/0157195 A1 | 6/2012 | Sum |
| 2012/0172108 A1 | 7/2012 | Acres |
| 2012/0172130 A1 | 7/2012 | Acres |
| 2012/0270638 A1 | 10/2012 | Eubanks |
| 2013/0005446 A1 | 1/2013 | Englman |
| 2013/0065663 A1 | 3/2013 | Johnson |
| 2013/0065665 A1 | 3/2013 | Watkins |
| 2013/0157756 A1 | 6/2013 | Hall |
| 2014/0087829 A1 | 3/2014 | Watkins |
| 2014/0094303 A1 | 4/2014 | Wabschall |
| 2014/0179396 A1 | 6/2014 | Aoki |
| 2014/0221071 A1 | 8/2014 | Calio |
| 2014/0302909 A1 | 10/2014 | Meyer |
| 2014/0342802 A1 | 11/2014 | Itagaki |
| 2014/0349732 A1 | 11/2014 | Pawloski |
| 2015/0018070 A1 | 1/2015 | Meyer |
| 2015/0045106 A1 | 2/2015 | You |
| 2015/0087382 A1 | 3/2015 | Gilbertson |
| 2015/0221176 A1 | 8/2015 | Meyer |
| 2015/0228163 A1 | 8/2015 | Clarebrough |
| 2015/0302482 A1 | 10/2015 | Vagner |
| 2015/0356813 A1 | 12/2015 | Mead |
| 2015/0379809 A1 | 12/2015 | Clarebrough |
| 2016/0049050 A1 | 2/2016 | Berman |
| 2016/0358412 A1 | 12/2016 | Eaton |
| 2017/0024970 A1 | 1/2017 | Sherrets |
| 2017/0032609 A1 | 2/2017 | Inamura |
| 2017/0032611 A1 | 2/2017 | Luong |
| 2017/0092071 A1 | 3/2017 | Cuddy |
| 2017/0124805 A1 | 5/2017 | Prabhu |
| 2017/0178460 A1 | 6/2017 | Berman |
| 2017/0301177 A1 | 10/2017 | Pawloski |
| 2019/0318579 A1 | 10/2019 | Marsh |

FOREIGN PATENT DOCUMENTS

| | | |
|---|---|---|
| AU | 2011285816 B2 | 4/2015 |
| AU | 2016234913 A1 | 4/2017 |
| JP | 2016202587 A | 12/2016 |

OTHER PUBLICATIONS

Notice of Allowance dated Sep. 3, 2020 for U.S. Appl. No. 15/951,802 (pp. 1-8).
Office Action dated Oct. 28, 2020 for U.S. Appl. No. 16/841,290 (pp. 1-17).
Notice of Allowance dated Sep. 25, 2020 for U.S. Appl. No. 16/100,851 (pp. 1-5).
Office Action dated Jan. 25, 2021 for U.S. Appl. No. 16/841,337 (pp. 1-11).
Office Action dated Feb. 5, 2021 for U.S. Appl. No. 16/122,592 (pp. 1-9).
Office Action dated Feb. 4, 2021 for U.S. Appl. No. 16/841,290 (pp. 1-8).
Australian Examination Report No. 1 for App. No. AU2016234913, dated Feb. 9, 2021, 4 pages.
Notice of Allowance dated Feb. 24, 2021 for U.S. Appl. No. 16/841,290 (pp. 1-9).

(56) References Cited

OTHER PUBLICATIONS

Notice of Allowance dated Feb. 24, 2021 for U.S. Appl. No. 16/841,337 (pp. 1-9).
Notice of Allowance dated Apr. 28, 2021 for U.S. Appl. No. 16/122,592 (pp. 1-9).

GAMING SYSTEM AND APPARATUS FOR CONSECUTIVE ASCENDING AWARDS

CROSS REFERENCE TO RELATED APPLICATIONS

This application is a continuation of, and claims priority to, U.S. application Ser. No. 14/867,786, filed Sep. 28, 2015, entitled "GAMING SYSTEM AND APPARATUS FOR CONSECUTIVE ASCENDING AWARDS," the contents of which are hereby incorporated in their entirety.

BACKGROUND

The embodiments described herein relate generally to gaming machines and, more particularly, to systems and methods for providing consecutively ascending awards.

At least some known gaming machines provide a base game and a bonus game. For example, a bonus game may include free plays that are associated with a probability of a payout and do not require a player to deposit money or credits to the gaming machine. A bonus game may be triggered by a condition, such as a particular combination of symbols associated with a base play outcome in the base game.

Executing free plays creates free play outcomes, which may be winning (e.g., associated with a payout) or non-winning. At least some known gaming machines present both outcomes to the player. The player does not have a guarantee of an increasing award, regardless of symbol combinations, bet amounts wagered, or the like. Moreover, despite high player anticipation, such gaming machines typically present short bonus games that last a few seconds, or cumulatively a few minutes. Typical win amounts are small, since the game does not last long enough or present increasing awards that would accumulate into a larger pot. This causes diminished player interest and results in a lower likelihood of the gaming machine being utilized for a long period of time.

BRIEF DESCRIPTION

In one aspect, a gaming machine is provided. The gaming machine includes a cabinet and an input device supported by the cabinet. The input device includes one or more of at least one button and a touch screen display device. The gaming machine also includes a plurality of mechanical reels supported by the cabinet, a video display device, and a game controller enclosed within the cabinet and including a processor and a non-transitory memory device. The non-transitory memory device stores instructions, which when executed by the processor, cause the game controller to at least determine a plurality of reel stop positions for the plurality of mechanical reels, cause the plurality of mechanical reels to spin and stop at positions that correspond to the plurality of reel stop positions, and determine a base outcome. The base outcome includes a plurality of symbols displayed by the plurality of reels when stopped. The instructions further cause the game controller to determine that the base outcome is associated with a predetermined symbol combination, and in response to the base outcome being associated with the predetermined symbol combination, initiate a bonus display sequence via the video display device and the plurality of mechanical reels. The bonus display sequence includes a plurality of bonus outcomes. The instructions further cause the game controller to, prior to displaying any of the plurality of bonus outcomes, determine a quantity of free spins; determine an outcome for each of the quantity of free spins, the outcome for each of the quantity of free spins including an outcome amount and reel stop positions. and store the outcome, including the outcome amount and reel stop positions, for each of the quantity of free spins in the non-transitory memory device. The instructions further cause the game controller to determine at least one additional free play outcome, the at least one additional free play outcome including a corresponding outcome amount and reel stop positions; identify i) a plurality of winning outcomes and ii) a plurality of non-winning outcomes among the outcomes for each of the quantity of free spins stored in the non-transitory memory device based on the outcome amount associated with the outcome for each of the quantity of free spins; and sort, in ascending order based on the outcome amount for each of the plurality of winning outcomes, the plurality of winning outcomes in a table stored in the non-transitory memory device. The instructions further cause the game controller to control the plurality of mechanical reels to display the plurality of winning outcomes in order retrieved from the table stored in the non-transitory memory device, and control the plurality of mechanical reels to display the at least one additional free play outcome when the corresponding outcome amount associated with the at least one additional free play outcome is equal to or greater than the respective free play outcome of the plurality of winning outcomes.

In another aspect, a non-transitory computer-readable storage medium is provided. The non-transitory computer-readable storage medium has computer-executable instructions embodied thereon, which when executed by a game controller, cause the game controller to at least display a plurality of reels via a presentation device, determine a plurality of reel stop positions for a plurality of reels, cause the plurality of reels to spin and stop at positions that correspond to the plurality of reel stop positions, and determine a base outcome. The base outcome includes a plurality of symbols displayed by the plurality of reels when stopped. The instructions further cause the game controller to determine that the base outcome is associated with a predetermined symbol combination, and in response to the base outcome being associated with the predetermined symbol combination, initiate a bonus display sequence via the presentation device. The bonus display sequence includes a plurality of bonus outcomes. The instructions further cause the game controller to, prior to displaying any of the plurality of bonus outcomes, determine a quantity of free spins; determine an outcome for each of the quantity of free spins, the outcome for each of the quantity of free spins including an outcome amount and reel stop positions; store the outcome, including the outcome amount and reel stop positions, for each of the quantity of free spins in a memory device; and determine at least one additional free play outcome. The at least one additional free play outcome includes a corresponding outcome amount and reel stop positions. The instructions further cause the game controller to identify i) a plurality of winning outcomes and ii) a plurality of non-winning outcomes among the outcomes for each of the quantity of free spins stored in the memory device based on the outcome amount associated with the outcome for each of the quantity of free spins; sort, in ascending order based on the outcome amount for each of the plurality of winning outcomes, the plurality of winning outcomes in a table stored in the memory device; control the presentation device to display the plurality of winning outcomes in order retrieved from the table stored in the memory device; and control the presentation device to display the at least one additional free play outcome when the corresponding outcome amount associated with the at least one additional free play outcome is equal to or greater than the respective free play outcome of the plurality of winning outcomes.

In yet another aspect, a gaming machine includes a cabinet and an input device supported by the cabinet. The input device includes one or more of at least one button and a touch screen display device. The gaming machine also includes a presentation device supported by the cabinet, and a game controller enclosed within the cabinet and including a processor and a non-transitory memory device. The non-transitory memory device stores instructions, which when executed by the processor, cause the game controller to at least determine a plurality of reel stop positions for a plurality of reels, cause the plurality of reels to spin and stop at positions that correspond to the plurality of reel stop positions, and determine a base outcome. The base outcome includes a plurality of symbols displayed by the plurality of reels when stopped. The instructions further cause the game controller to determine that the base outcome is associated with a predetermined symbol combination, and in response to the base outcome being associated with the predetermined symbol combination, initiate a bonus display sequence via the presentation device. The bonus display sequence includes a plurality of bonus outcomes. The instructions further cause the game controller to, prior to displaying any of the plurality of bonus outcomes, determine a quantity of free spins; determine an outcome for each of the quantity of free spins, the outcome for each of the quantity of free spins including an outcome amount and reel stop positions; store the outcome, including the outcome amount and reel stop positions, for each of the quantity of free spins in the non-transitory memory device; and determine at least one additional free play outcome. The at least one additional free play outcome includes a corresponding outcome amount and reel stop positions. The instructions further cause the game controller to identify i) a plurality of winning outcomes and ii) a plurality of non-winning outcomes among the outcomes for each of the quantity of free spins stored in the non-transitory memory device based on the outcome amount associated with the outcome for each of the quantity of free spins; sort, in ascending order based on the outcome amount for each of the plurality of winning outcomes, the plurality of winning outcomes in a table stored in the non-transitory memory device; control the presentation device to display the plurality of winning outcomes in order retrieved from the table stored in the non-transitory memory device; and control the presentation device to display the at least one additional free play outcome when the corresponding outcome amount associated with the at least one additional free play outcome is equal to or greater than the respective free play outcome of the plurality of winning outcomes.

DETAILED DESCRIPTION OF THE INVENTION

Exemplary embodiments of systems and methods for use in presenting consecutively ascending awards on free plays on a gaming machine (e.g., free spins on a mechanical or electronic reel game) are described herein. Such embodiments may enhance an entertainment aspect of the game by providing consecutively ascending award amounts. In an exemplified embodiment, the base game is a mechanical reel-spinning game, and the bonus game is a free-spin feature. Although the game system features are described using this configuration, the game system is not limited to this one game type. The consecutively ascending awards feature can be implemented on a standalone game machine or in a network of a game server connected to multiple game machines. The game server implementation is advantageous in that there is a single point of accounting control so that all extra games awarded, winning and non-winning, can be stored and audited for legal compliance. The server implementation also allows for flexibility in adjusting the bonus game play parameters, within legal limits, to create different "feels" for different players although the game is the same. That is, a player who prefers a higher volatility game can be identified (via a player loyalty card, for example), and the game adjustment parameters may be substituted for the default values. This way, each game or group of games can be tailored to the preference of that player. The dynamic control of game properties requires the connectivity to the game server and the player database server.

Exemplary technical effects of systems and methods described herein include at least steps to: (a) determine that a bonus play trigger condition is satisfied based on an execution of a base game resulting in a base play outcome of a plurality of base play outcomes, (b) execute a free play of a plurality of free plays based on the bonus play trigger condition to create a free play outcome of a plurality of free play outcomes, (c) determine that a free play termination trigger condition is met, (d) execute an additional free play of the plurality of free plays if the free play termination trigger condition is not met to create an additional free play outcome, (e) terminate the free play game if it is determined that the free play termination trigger condition is met, (f) sort, in ascending order, the payout amount of the free game outcomes, discarding the non-winning outcomes, and (g) display, on the presentation device, results associated with the sorted free play outcomes.

Figure 1:
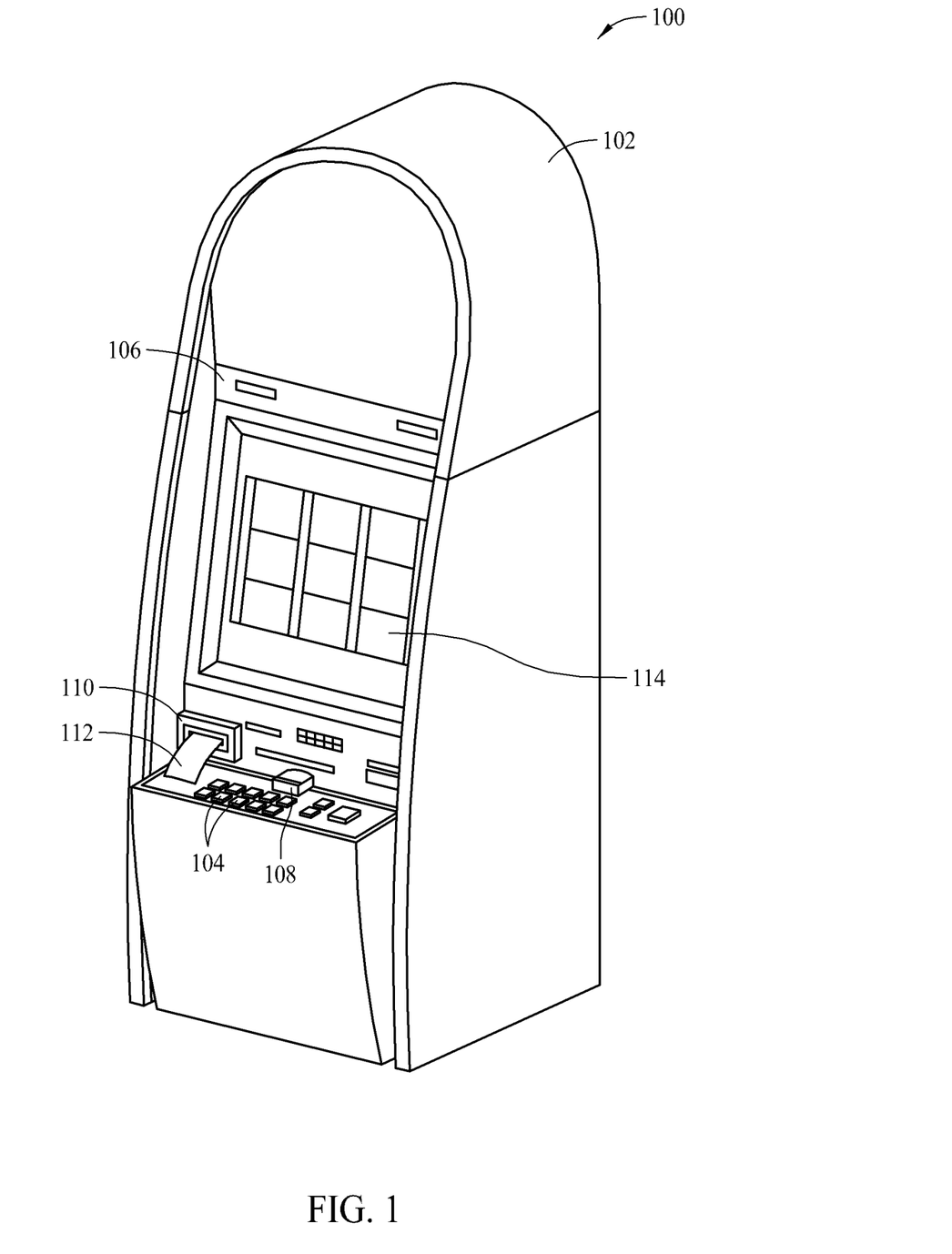
FIG. 1 is a schematic diagram of an exemplary gaming machine.

FIG. 1 is a schematic diagram of an exemplary gaming machine 100 that facilitates presenting consecutively ascending free play outcomes. Gaming machine 100 may be any type of gaming machine, and may include, without limitation, different structures than those shown in FIG. 1. Moreover, gaming machine 100 may employ different methods of operation than those described below.

In the exemplary embodiment, gaming machine 100 includes a cabinet 102 configured to house a plurality of components, such as a gaming machine controller, peripheral devices, presentation devices, and player interaction devices. For example, in an exemplary embodiment, gaming machine 100 includes a plurality of switches and/or buttons 104 that are coupled to a front 106 of cabinet 102. Buttons 104 may be used to start play of a base or bonus game. One button 104 may be a "Bet One" button that enables the player to place a bet or to increase a bet. Another button 104 may be a "Bet Max" button that enables the player to bet a maximum permitted wager. Yet another button 104 may be a "Cash Out" button that enables the player to receive a cash payment or other suitable form of payment, such as a ticket or voucher, which corresponds to a number of remaining credits.

In the exemplary embodiment, gaming machine 100 also includes a coin acceptor 108 for accepting coins and/or tokens, and a bill acceptor 110 for accepting and/or validating cash bills, coupons, and/or ticket vouchers 112. Bill acceptor 110 may also be capable of printing tickets 112. Furthermore, in some embodiments, bill acceptor 110 includes a card reader or validator for use with credit cards, debit cards, identification cards, and/or smart cards. The cards accepted by bill acceptor 110 may include a magnetic strip and/or a preprogrammed microchip that includes a player's identification, credit totals, and any other relevant information that may be used. Moreover, in the exemplary embodiment, gaming machine 100 includes one or more presentation devices 114. Presentation devices 114 are mounted to cabinet 102, and may include a base presentation device for displaying a base game and a bonus presentation device for displaying a bonus or bonus game. Presentation devices 114 may include, without limitation, a plasma display, a liquid crystal display (LCD), a display based on light emitting diodes (LEDs), organic light emitting diodes (OLEDs), polymer light emitting diodes (PLEDs), and/or surface-conduction electron emitters (SEDs), a speaker, an alarm, and/or any other device capable of presenting information to a user.

In an exemplary embodiment, presentation device 114 is used to display one or more game image, symbols and indicia such as a visual representation or exhibition of movement of an object such as a mechanical, virtual, or video reel, dynamic lighting, video images, and the like. In an alternative embodiment, presentation device 114 displays images and indicia using mechanical means. For example, presentation device 114 may include an electromechanical device, such as one or more rotatable reels, to display a plurality of game or other suitable images, symbols, or indicia.

In one embodiment, gaming machine 100 randomly generates game outcomes using probability data. For example, each game outcome is associated with one or more probability values that are used by gaming machine 100 to determine the game output to be displayed. Such a random calculation may be provided by a random number generator, such as a true random number generator (RNG), a pseudo-random number generator (PNG), or any other suitable randomization process.

Figure 2:
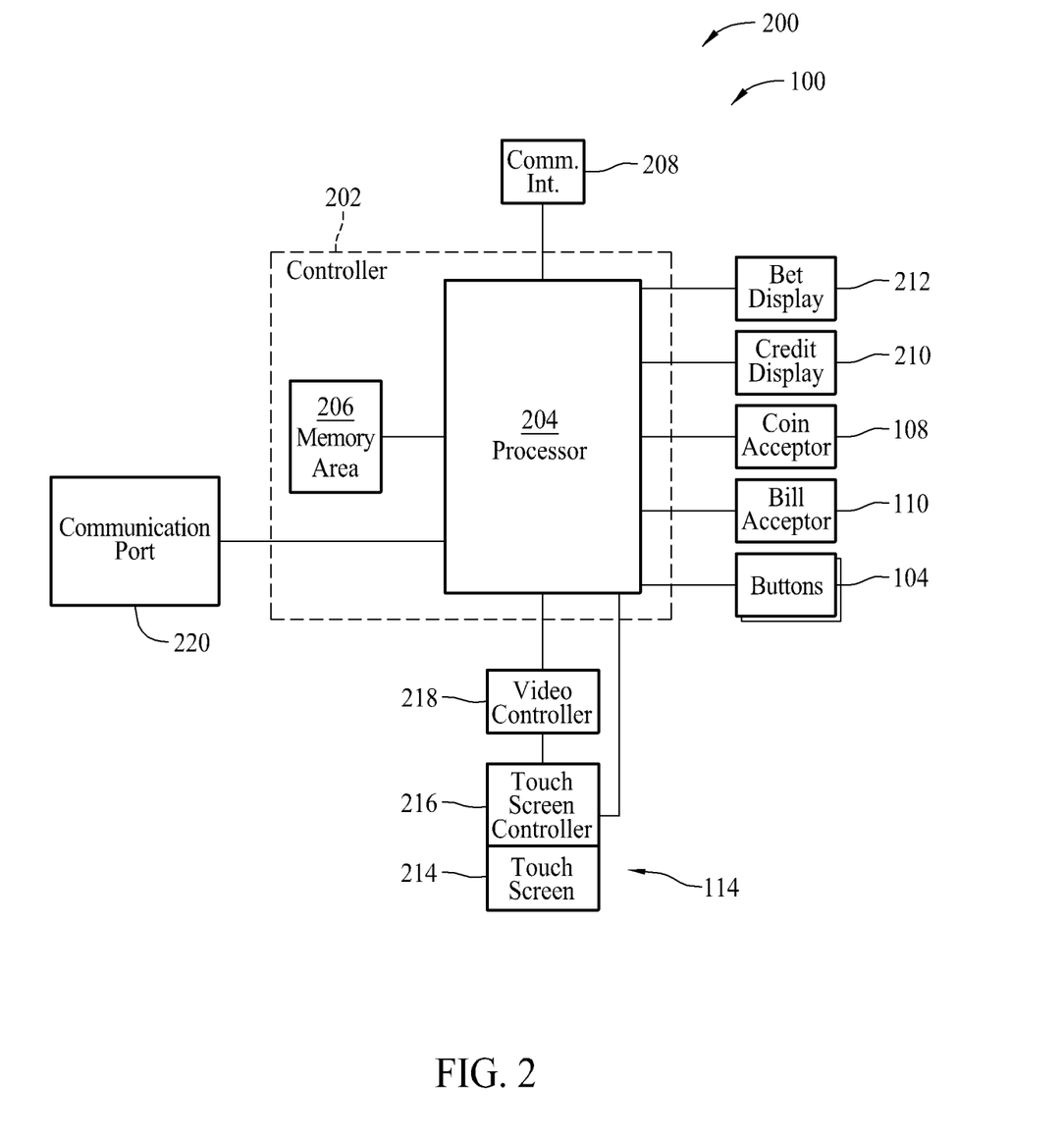
FIG. 2 is a schematic block diagram of an exemplary electrical architecture that may be used with the gaming machine shown in FIG. 1.

FIG. 2 is a schematic block diagram of an exemplary electrical architecture 200 that may be used with gaming machine 100. In the exemplary embodiment, gaming machine 100 includes a gaming machine controller 202 having a processor 204 communicatively coupled a memory area 206. Moreover, in the exemplary embodiment, processor 204 and memory area 206 reside within cabinet 102 (shown in FIG. 1) and may be collectively referred to herein as a "computer" or "controller." Gaming machine 100 is configurable and/or programmable to perform one or more operations described herein by programming processor 204. For example, processor 204 may be programmed by encoding an operation as one or more executable instructions and providing the executable instructions in memory area 206.

Controller 202 communicates with one or more other gaming machines 100 or other suitable devices via a communication interface 208. Processor 204 may be a microprocessor, a microcontroller-based platform, a suitable integrated circuit, and/or one or more application-specific integrated circuits (ASICs). However, the above examples are exemplary only, and thus are not intended to limit in any way the definition and/or meaning of the term "processor."

Memory area 206 stores program code and instructions, executable by processor 204, for controlling gaming machine 100. For example, memory area 206 stores data such as image data, event data, player input data, random or pseudo-random number generation software, pay table data, and/or other information or applicable game rules that relate to game play on gaming machine 100. Moreover, memory area 206 may include one or more forms of memory. For example, memory area 206 can include random access memory (RAM), read-only memory (ROM), flash memory, and/or electrically erasable programmable read-only memory (EEPROM). In some embodiments, other suitable magnetic, optical, and/or semiconductor-based memory may be included in memory area 206 by itself or in combination.

In the exemplary embodiment, gaming machine 100 includes a credit display 210, which displays a player's current number of credits, cash, account balance or the equivalent. Gaming machine 100 also includes a bet display 212 which displays a player's amount wagered. Credit display 210 and bet display 212 may be standalone displays independent of presentation device 114, or credit display 210 and bet display 212 may be incorporated into presentation device 114.

Moreover, in an exemplary embodiment, presentation device 114 is controlled by controller 202. In some embodiments, presentation device 114 includes a touch screen 214 and an associated touch screen controller 216. A video controller 218 is communicatively coupled to controller 202 and touch screen controller 216 to enable a player to input game play decisions into gaming machine 100 via touch screen 214. Furthermore, gaming machine 100 includes one or more communication ports 220 that enable controller 202 to communicate with external peripheral devices (not shown) such as, but not limited to, external video sources, expansion buses, game or other displays, a SCSI port, or a key pad.

Furthermore, and in the exemplary embodiment, controller 202 is programmed to execute one or more free plays when one or more free play trigger conditions are satisfied, and to present consecutively ascending free play outcomes. For example, when at least one free play outcome is associated with a payout, controller 202 may cause presentation device 114 to present a free play bonus mode (e.g., a red screen) and to present each winning free play outcome in the free play bonus mode.

Figure 3:
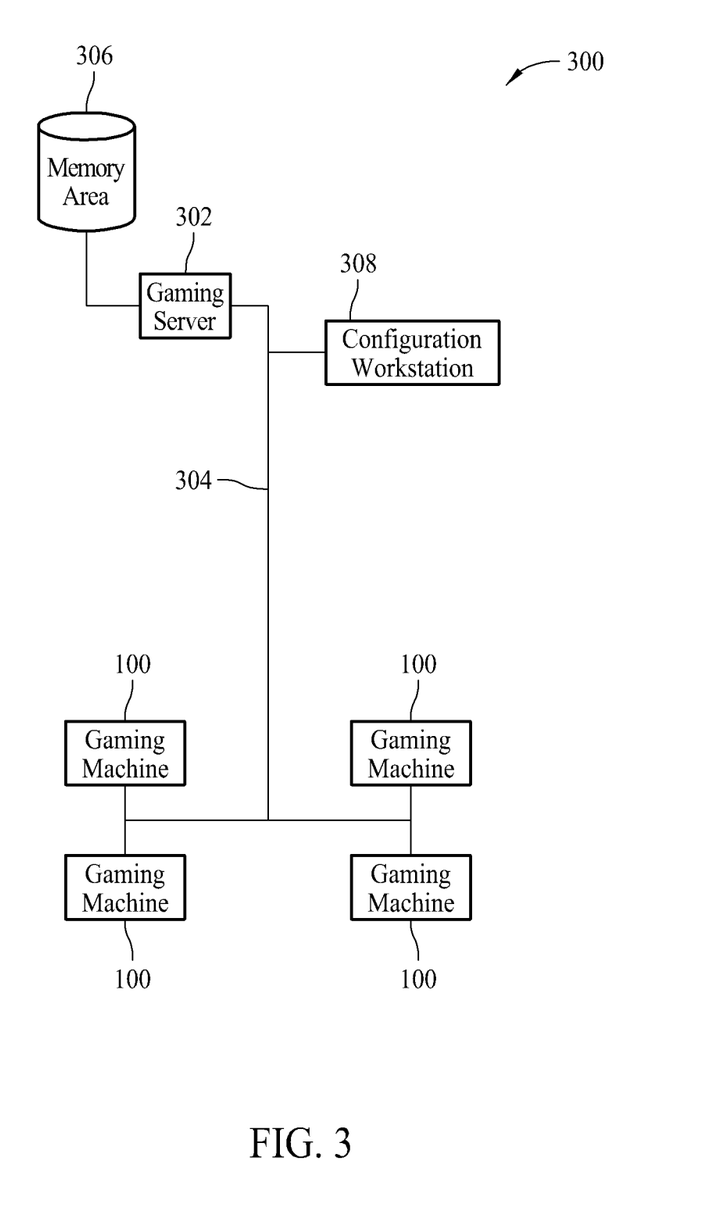
FIG. 3 is a block schematic diagram of an exemplary gaming system that includes a plurality of gaming machines shown in FIG. 1.

FIG. 3 is a block schematic diagram of an exemplary gaming system 300 that includes a plurality of gaming machines 100. Each gaming machine 100 is coupled via communication interface 208 to one or more servers, such as a gaming server 302, using a network 304. Gaming server 302 includes a processor (not shown) that facilitates data communication between each gaming machine 100 and other components of gaming system 300. Such data is stored in, for example, a memory area 306, such as a database, that is coupled to gaming server 302.

As described above, gaming machines 100 may include video bingo machines, video poker machines, video slot machines, and/or other similar gaming machines that implement alternative games. Moreover, gaming machines 100 may be terminal-based machines, wherein the actual games, including random number generation and/or outcome determination, are performed at gaming server 302. In such an embodiment, gaming machine 100 displays results of the game via presentation device 114 (shown in FIGS. 1 and 2).

Moreover, in the exemplary embodiment, gaming system 300 includes a configuration workstation 308 that includes a user interface that enables an administrator to set up and/or to modify portions of gaming system 300 and/or gaming server 302. Gaming server 302 may perform a plurality of functions including, for example, game outcome generation, player tracking functions, and/or accounting functions. However, in alternative embodiments, gaming system 300 may include a plurality of servers that separately perform these functions and/or any suitable function for use in a network-based gaming system. In some embodiments, gaming server 302 controls bonus applications or bonus systems that award bonus (e.g., base play bonuses and/or free plays) opportunities on gaming system 300. Moreover, gaming server 302 may include a set of rules for awarding jackpots in excess of those established by winning pay tables (not shown) of each gaming machine 100. Some bonus awards may be awarded randomly, while other bonus awards may be made to groups of gaming machines 100 operating in a progressive jackpot mode.

Moreover, in some embodiments, gaming server 302 tracks data of players using gaming machines 100, and also controls elements (e.g., messages and/or bonus modes) that appear on presentation device 114 of gaming machines 100. For example, gaming server 302 can store physical characteristics of players, such as, but not limited to, the player age. Gaming server 302 can also store data related to the players and tracked using player tracking identification, such as a player card. Moreover, gaming server 302 can store information and data about the player such as loyalty points, player address, phone number, and/or any information that may be retrieved and transmitted to gaming machines 100. In some embodiments, gaming server 302 stores and tracks information such as, but not limited to, the average amount of wager played at gaming machine 100. Moreover, gaming server 302 can track an average amount of wagers by the player, any funds the player may have in an account, and data relating to reportable events. Such data is associated with individual players and logged using a taxable accrual log.

Figure 4:
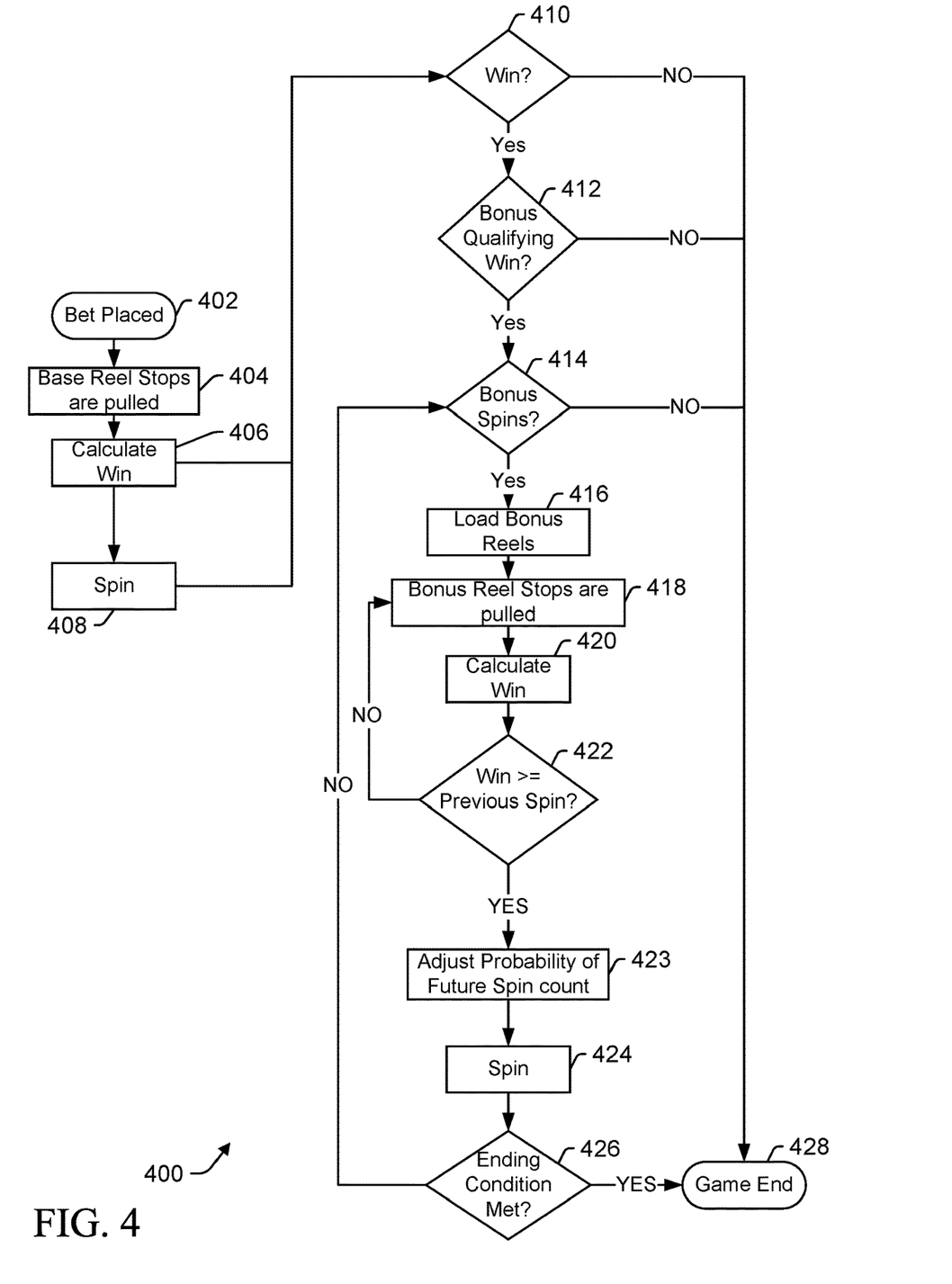
FIG. 4 is a flowchart that illustrates an exemplary method for presenting consecutive ascending free play outcomes during game play at the gaming machine shown in FIG. 1.

FIG. 4 is a flowchart 400 that illustrates an exemplary method for presenting consecutive ascending awards during game play at gaming machine 100 (shown in FIGS. 1 and 2). Referring to FIGS. 2 and 4, in the exemplary embodiment, while presenting a non-bonus, or "base," game, controller 202 receives 402 a base play input (e.g., via a button 104 and/or presentation device 114). For example, the base play input may include a "bet placed" and/or a "start play" action.

Controller 202 executes 404 one or more base plays, creating base play outcomes that each correspond to an executed base play (e.g., reel stops in a sequence of reels may be spun, instantiated or pulled in order to create base play outcomes). In exemplary embodiments, executing 404 a base play includes selecting a combination of game symbols (e.g., using an RNG or a PNG) and determining whether the selected combination is associated with a payout based on a base play pay table.

In the exemplary embodiment, controller 202 calculates 406 whether a base play game has resulted in a win. If there is not a win, controller 202 causes the game to end at 428. If there is a win, controller 202 initiates 408 another reel spin and determines 412 whether the win satisfies a bonus qualifying condition or not. In one embodiment, controller 202 randomly chooses (e.g., using an RNG or a PNG) whether to generate a bonus (bonus) game. In other words, controller 202 may use a RNG or PNG to generate a random binary value, such that a positive value (or heads, or 1) triggers a bonus game, whereas a negative value (or tails, or 0) does not trigger a bonus game. Although the trigger is random, controller 202 is configured, in one embodiment, to add a weight value to the random number in order to achieve a specific outcome. For example, controller 202 is configured to add a larger weight value to the probability of the bonus game being triggered if the player bets more, if the number of games played exceeds a certain threshold, if a trigger has not occurred in a predefined amount of time, or the like. Similarly, the likelihood of a trigger may be weighted towards a lower probability of occurrence if a bonus game has just taken place in a predefined number of immediately preceding spins, if the player did not play a maximum bet, if there has been a predefined number of consecutive number of free spins already given out, or the like. Similarly, if the base game's award happens to be the highest payout award (e.g., a Top-level Jackpot), then controller 202 is configured to prevent bonus free spins from occurring, thus ending the base game itself without any bonus game. In the example embodiment, by controlling the weight of the triggering condition, the characteristics of the game can thus be shaped to fit certain player demographics (e.g., to achieve a certain game volatility desired by the designer).

Thus, if it was not a bonus qualifying win, the game ends 428. If it was a bonus qualifying win, controller 402 determines 414 that there will be bonus game spins. In exemplary embodiments, the possibility and number of bonus spins is determined using a RNG or PNG.

If the RNG/PNG generates outcomes leading to one or more bonus spins, controller 202 loads 416 bonus reels to begin bonus spins. Controller 202 executes 418 one or more bonus plays, creating bonus play outcomes that each correspond to an executed bonus play (e.g., reel stops in a sequence of reels may be spun, instantiated or pulled in order to create base play outcomes). In exemplary embodiments, executing a bonus play includes selecting a combination of game symbols (e.g., using an RNG or a PNG) and determining whether the selected combination is associated with a payout based on a bonus play pay table. In the example embodiment, controller 202 is configured to be able to choose the number and type of symbols in the bonus game. The number of symbols and type of symbols may vary by bonus game.

Moreover, controller 202 is configured to vary the frequency of occurrence of specific symbols. In one embodiment, both the base and bonus (free-spin) games share the same symbols and pay table. Other variations are feasible to achieve other game-feels. For example, the symbol set for the bonus game may be the same as the base game, but the quantity of winning symbols on each reel may be increased, allowing for a higher win frequency. Similarly, the quantity of the bonus game symbols may be uniformly scaled to be proportionately less than that of a base game, and that would also result in a higher hit frequency. Special symbols can also be inserted into the bonus game to give better pay outs, or certain symbol combinations that only pay in the bonus game, etc. In other embodiments, the pay tables may be different between a base and a bonus game.

Controller 202 calculates 420 a winning outcome from the bonus game. In one embodiment, if the winning outcome is less than the outcome from the previous play execution (e.g., reel spins) at 422, controller 202 is configured to spin the reels again. For example, controller 202 may generate a random number using a RNG or PNG and use the random number to calculate the outcome of a reel spin. Controller 202 is configured to generate a random number, calculate a current outcome, compare the current outcome to the previous outcome (i.e., from the reel spin immediately preceding the current spin) and repeat the random number generation if the current outcome is lesser in quantity compared to the previous outcome. For example, if the previous outcome resulted in a win awarding the player ten credits, controller 202 will generate random numbers for the current outcome until the current outcome results in ten or more credits.

Controller 202 is also configured to adjust 423 the duration of the bonus game. More specifically, controller 202 is configured to adjust the probable number of future spins at each free spin in the bonus game. For example, after Free Spin 1, controller 202 generates a random number using a RNG/PNG, multiplies it by a specific integer factor and truncates any decimal portion to arrive at a whole number of future free spins. In one embodiment, the number of future free spins may also be limited to within a range of 0 through 10. Assume that the number of future free spins is greater than zero, i.e., at least 1, therefore there will be another free spin. So controller 202 executes Free Spin 2. At the execution of Free Spin 2, controller 202 is configured to generate a new random number using a RNG/PNG, multiply the new random number by the specific integer factor, truncate any decimal portion and arrive at a new whole number of future free spins. If the new whole number is non-zero, there will be at least one more free spin.

If the current outcome of a free spin is equal to or greater than the previous outcome, controller 202 is configured to execute 424 another bonus play (e.g., another reel spin). Controller 202 checks 426 to see if a termination condition is met (e.g., a certain number of bonus spins, a timing condition, a maximum reward condition, etc.). If the termination condition is not met at 426, controller 202 is configured to repeat the execution of a bonus play from step 414, proceeding to load 416 bonus reels, execute 418 bonus play reel spins, and so on. Once the termination condition is met at 426, controller 202 is configured to cause 428 the game to end and signal to the player that the game has ended.

As noted, the bonus ending condition terminates the bonus free-spin game at 426. Similar the bonus qualifying condition, the bonus ending condition is also randomly determined, weighted by certain criteria. For example, if the quantity of free spin games has exceeded a defined threshold, the additional free games will be weighted such that additional free games are increasingly less likely, etc. Similarly, the likelihood of obtaining a free game may increase with higher bet amount, with the amount of time passed without a bonus game, with the quantity of base game played exceeded a design threshold, and the like. If a free spin resulted in, for example, a top Jackpot payout, the bonus game terminates. If multiple progressive levels (e.g., copper, silver, gold, platinum levels) are involved, the bonus game may or may not terminate, depending on the system design.

In another embodiment, controller 202 is configured to apply method 400 to a group of gaming devices, or eligible game devices. Eligibility may be a requirement across multiple game devices or on each individual machine separately (e.g., all participating machines must accumulate a specific number of games within a predefined period, or each machine must make maximum bets for a predefined number of consecutive games, or each eligible machine will be randomly chosen, etc.). Controller 202 is configured to execute a group bonus game at specific time intervals (e.g., every 5 minutes, random time, etc.), or when there are a sufficient number of eligible participating machines. The game generation and sorting mechanics remains the same, but controller 202 is also configured to present the game to each player in his or her local game theme (whichever game theme each is playing). Additionally, controller 202 is configured to scale the rewards proportionately to each game's denomination (e.g., using bet equalization).

Otherwise, based on determining 415 that no base play bonus trigger condition is satisfied, controller 202 determines 430 whether one or more free play trigger conditions are satisfied. In some embodiments, a free play trigger condition is satisfied whenever controller 202 determines 415 that no base play bonus trigger condition is satisfied. In addition, or alternative to, controller 202 may determine 430 that a free play trigger condition is satisfied by generating a random number (e.g., using an RNG or a PNG) and determining that the random number is within a predetermined range. As another example, controller 202 may determine 430 that a free play trigger condition is satisfied by determining that a base play outcome is associated with a predetermined symbol combination. As a further example, controller 202 may determine 430 that a free play trigger condition is satisfied by determining that the quantity of credits (e.g., money) deposited in gaming machine 100 exceeds a predetermined "coin-in" threshold value. The coin-in threshold value may be defined as a quantity of credits, as a quantity of credits within a predetermined amount of time (e.g., thirty minutes), and/or as a quantity of credits within a single session of game play (e.g., by one player at one gaming machine 100). Any quantity of free play trigger conditions may be defined and stored in memory area 206.

As described above, in exemplary embodiments, controller 202 enables a base play bonus or a free play bonus, but not both. Alternatively, controller 202 may allow both a base play bonus and a free play bonus. In some embodiments, controller 202 determines 430 whether any free play trigger condition is satisfied even after determining 415 that a base play bonus trigger condition is satisfied.

Some embodiments facilitate providing a free play bonus to a group of gaming machines 100. In such embodiments, controller 202 may determine 430 that a free play trigger condition is satisfied by receiving (e.g., via communication interface 208) a free play notification from another gaming machine 100 and/or from a gaming server 302 (shown in FIG. 3), as described in more detail below. Further, controller 202 may transmit 435 a free play notification, indicating that the free play trigger condition is satisfied, to another gaming machine 100 and/or to a gaming server 302.

Controller 202 executes 440 one or more free plays based on a free play trigger condition being satisfied to create one or more free play outcomes. In exemplary embodiments, controller 202 determines whether each free play outcome is associated with a payout based on a free play pay table. The free play pay table may be the same as or different from the base play pay table. Free play outcomes associated with a payout are considered winning free play outcomes, whereas free play outcomes that are not associated with a payout are considered non-winning free play outcomes. In one embodiment, controller 202 discards non-winning free play outcomes. In another embodiment, non-winning free play outcomes are preserved.

In some embodiments, controller 202 executes 410 base plays using a base play pay table and executes 440 free plays based using a free play pay table that is different from the base play pay table. For example, the base play table may associate payouts with one set of symbol combinations, and the free play table may associate payouts with a different set of symbol combinations. As another example, base play execution 410 and the corresponding base play pay table may be associated with a set of base play symbols, whereas free play execution 440 and the corresponding free play pay table may be associated a set of free play symbols. In addition, or alternative to, the free play pay table may include a proportion of winning play outcomes that is higher than the proportion of winning play outcomes in the base play pay table. Further, the free play pay table may include winning play outcomes that have an average payout that is lower than or higher than the average payout of winning play outcomes in the base play pay table.

In some embodiments, when any free play trigger condition is satisfied, controller 202 executes 440 a predetermined quantity (e.g., three, five, or seven) of free plays. In other embodiments, controller 202 determines 437 the quantity of free plays to execute 440 based on a minimum quantity of free plays, a maximum quantity of free plays, and a random number (e.g., generated using an RNG or a PNG). In the exemplary embodiment, controller 202 stores (e.g., in memory area 206) a weighted table that includes a plurality of free play quantities, each of which is associated with a weight. For example, quantities of 3, 4, 5, 6, and 7 may be associated with weights 97%, 93%, 87%, 75%, and 50%, respectively. Controller 202 generates a random number (e.g., between 0 and 1) and converts the random number into a percentage, such as by multiplying the random number by 100 and discarding the non-integral portion of the product (e.g., by calculating the product modulo 100). Such an embodiment enables a non-uniform occurrence rate for the available free play quantities. For example, as illustrated above, a quantity of three free plays may be selected more frequently as a quantity of four free plays is selected.

In the exemplary embodiment, controller 202 stores 445 winning and/or non-winning free play outcomes (e.g., in memory area 206). Stored free play outcomes may be later included in a report created by controller 202. For example, controller 202 may create an audit report that includes events (e.g., plays and play outcomes) that have occurred at gaming machine 100 over a period of time.

Controller 202 presents 420 any base play outcomes and also presents 425 any base play bonuses. If controller 202 has executed 440 free plays based on a free play retrigger condition being satisfied, as described below, it is possible that no base play outcomes or base play bonuses will exist for presentation 420 and 425.

When a winning free play outcome exists (i.e., at least one free play outcome is a winning free play outcome), controller 202 presents 450 (e.g., via presentation device 114) the winning free play outcomes. If no free plays have been executed 440 (e.g., due to no free play trigger condition being satisfied), it follows that no winning free play outcomes exist.

In some embodiments, controller 202 presents 447 (e.g., via presentation device 114) a free play bonus mode when at least one free play outcome is a winning free play outcome and presents 450 the winning free play outcomes in the free play bonus mode. For example, the free play bonus mode may include a graphical distinction from the base play mode and/or a predetermined free play bonus sound. In the exemplary embodiment, controller 202 presents 447 the free play bonus mode by displaying a red screen (e.g., a red background) via presentation device 114. Free play information, such as symbols selected by controller 202 during execution 440 of a free play, may be overlaid on the red screen. In the exemplary embodiment, if no winning free play outcomes exist, controller 202 does not present 447 the free play bonus mode.

Some embodiments facilitate presenting 450 winning free play outcomes according to a predetermined sequence. In such embodiments, prior to presenting 450 winning free play outcomes, controller 202 sorts 448 the winning free play outcomes. For example, controller 202 may sort 448 the winning free play outcomes in a sequence that is based on the associated payouts (e.g., increasing payout amounts). In the exemplary embodiment, such sorting 448 is possible because free plays are executed 440 prior to presentation 450.

As described above, free plays may be executed 440 based on one or more free play trigger conditions being satisfied during base play. Optionally, free plays may be "retriggered" during free play. In some embodiments, after presentation 450 of any winning free play outcomes, controller 202 determines 455 whether one or more free play retrigger conditions are satisfied.

Free play retrigger conditions may be similar to free play trigger conditions. For example, free play retrigger conditions may be based on a random number, one or more predetermined symbols or symbol combinations, and/or the quantity of credits deposited in gaming machine 100 (also known as "coin-in"), as described above with reference to determining 430 whether a free play trigger condition is satisfied during base play. In addition, or alternative to, free play retrigger conditions may be specific to free play. For example, the probability of retrigger free play based on a random number may be lower or higher than the probability of triggering free play based on a random number. Similarly, a free play retrigger condition and a free play trigger condition may be associated with different coin-in threshold values. Further, free play retrigger symbol combinations may be different from free play trigger conditions.

When controller 202 determines 455 that a free play retrigger condition is satisfied, controller 202 proceeds as if a free play trigger condition was determined 430 to be satisfied. For example, controller 202 executes 440 one or more free plays, as described above, optionally transmitting 435 a free play notification and/or determining 437 the quantity of free plays. The quantity of free plays for a free play retrigger may be determined 437 using a set of available quantities and/or a weighted table that are different from those used in response to a free play trigger during base play.

In some embodiments, controller 202 determines 455 that a free play retrigger condition is satisfied based on first free play outcomes and then executes 440 one or more free plays based on the free play retrigger condition to create one or more second free play outcomes. If another retrigger occurs, controller 202 may create third free play outcomes, and so on.

Some embodiments facilitate game play among a plurality of gaming machines 100. For example, referring to FIGS. 3 and 4, gaming server 302 may be configured to determine 430 that a free play trigger condition is satisfied and to transmit 435 a free play notification to one or more gaming machines 100. The free play notification indicates that the free play trigger condition is satisfied.

Gaming server 302 may determine 430 that the free play trigger condition is satisfied as described above (e.g., based on a random number, a random time, a predetermined symbol combination, and/or coin-in). For example, gaming server 302 may generate a random number and determine 430 that the free play trigger condition is satisfied when the random number is within a predetermined range. As another example, gaming server 302 may calculate a total quantity of credits deposited (e.g., coin-in) among gaming machines 100 (e.g., a quantity of credits, a quantity of credits within a predetermined amount of time, and/or a quantity of credits within a single session of game play).

In addition, or alternative to, a gaming machine 100 may transmit 435 a free play notification to gaming server 302. Gaming server 302 determines 430 that a free play trigger condition is satisfied based on the received free play notification and transmits 435 (e.g., forwards) the free play trigger condition to one or more other gaming machines 100. In some embodiments, a gaming machine 100 transmits 435 a free play notification directly to at least one other gaming machine 100.

In such embodiments, gaming machines 100 receive a free play notification from gaming server 302 and/or from another gaming machine 100. Gaming machines 100 determine 430 that a free play trigger condition is satisfied based on the received free play notification, execute 440 free plays and present 450 winning free play outcomes, as described above, optionally in a free play bonus mode.

The quantity of free plays may be determined 437 by gaming server 302 and/or by one or more gaming machines 100 (e.g., based on a minimum quantity of free plays, a maximum quantity of free plays, and a random number). Further, where gaming server 302 determines 437 the quantity of free plays or received the quantity of free plays from a gaming machine 100, gaming server 302 may transmit the determined quantity to one or more other gaming machines 100, which execute 440 the determined quantity of free plays to create the determined quantity of free play outcomes.

Exemplary embodiments of systems and methods for presenting winning free play outcomes are described herein. The systems and methods are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

A computer, controller, or server, such as those described herein, includes at least one processor or processing unit and a system memory. The computer, controller, or server typically has at least some form of computer readable media. By way of example and not limitation, computer readable media include computer storage media and communication media. Computer storage media include volatile and nonvolatile, removable and non-removable media implemented in any method or technology for storage of information such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Combinations of any of the above are also included within the scope of computer readable media.

Although the present invention is described in connection with an exemplary gaming system environment, embodiments of the invention are operational with numerous other general purpose or special purpose gaming system environments or configurations. The gaming system environment is not intended to suggest any limitation as to the scope of use or functionality of any aspect of the invention. Moreover, the gaming system environment should not be interpreted as having any dependency or requirement relating to any one or combination of components illustrated in the exemplary operating environment.

Embodiments of the invention may be described in the general context of computer-executable instructions, such as program components or modules, executed by one or more computers or other devices. Aspects of the invention may be implemented with any number and organization of components or modules. For example, aspects of the invention are not limited to the specific computer-executable instructions or the specific components or modules illustrated in the figures and described herein. Alternative embodiments of the invention may include different computer-executable instructions or components having more or less functionality than illustrated and described herein.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, the term "database" refers generally to any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DH2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

When introducing elements of aspects of the invention or embodiments thereof, the articles "a," "an," "the," and "said" are intended to mean that there are one or more of the elements. The terms "comprising," including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A gaming machine comprising:
a cabinet;
an input device supported by the cabinet, the input device includes one or more of at least one button and a touch screen display device;
a plurality of mechanical reels supported by the cabinet;
a video display device; and
a game controller enclosed within the cabinet and including a processor and a non-transitory memory device, the non-transitory memory device storing instructions, which when executed by the processor, cause the game controller to at least:
determine a plurality of reel stop positions for the plurality of mechanical reels;
cause the plurality of mechanical reels to spin and stop at positions that correspond to the plurality of reel stop positions;
determine a base outcome, the base outcome comprising a plurality of symbols displayed by the plurality of reels when stopped;
determine that the base outcome is associated with a predetermined symbol combination;
in response to the base outcome being associated with the predetermined symbol combination, initiate a bonus display sequence via the video display device and the plurality of mechanical reels, the bonus display sequence comprising a plurality of bonus outcomes;
prior to displaying any of the plurality of bonus outcomes:
determine a quantity of free spins;
determine an outcome for each of the quantity of free spins, the outcome for each of the quantity of free spins including an outcome amount and free-spin reel stop positions;
store the outcome, including the outcome amount and the free-spin reel stop positions, for each of the quantity of free spins in a memory;
determine at least one additional free play outcome, the at least one additional free play outcome including a corresponding outcome amount and additional reel stop positions;
identify i) a plurality of winning outcomes and ii) a plurality of non-winning outcomes among the outcomes for each of the quantity of free spins stored in the memory based on the outcome amount associated with the outcome for each of the quantity of free spins;
sort, in ascending order based on the outcome amount for each of the plurality of winning outcomes, the plurality of winning outcomes in a table stored in the memory;
control the plurality of mechanical reels to display the plurality of winning outcomes in order retrieved from the table stored in the memory; and
control the plurality of mechanical reels to display the at least one additional free play outcome when the corresponding outcome amount associated with the at least one additional free play outcome is equal to or greater than the respective free play outcome of the plurality of winning outcomes.

2. A non-transitory computer-readable storage medium having computer-executable instructions embodied thereon, which when executed by a game controller, cause the game controller to, at least:
display a plurality of reels via a presentation device;
determine a plurality of reel stop positions for a plurality of reels;
cause the plurality of reels to spin and stop at positions that correspond to the plurality of reel stop positions;
determine a base outcome, the base outcome comprising a plurality of symbols displayed by the plurality of reels when stopped;
determine that the base outcome is associated with a predetermined symbol combination;
in response to the base outcome being associated with the predetermined symbol combination, initiate a bonus display sequence via the presentation device, the bonus display sequence comprising a plurality of bonus outcomes;
prior to displaying any of the plurality of bonus outcomes:
determine a quantity of free spins;
determine an outcome for each of the quantity of free spins, the outcome for each of the quantity of free spins including an outcome amount and free-spin reel stop positions;
store the outcome, including the outcome amount and the free-spin reel stop positions, for each of the quantity of free spins in a memory device;
determine at least one additional free play outcome, the at least one additional free play outcome including a corresponding outcome amount and additional reel stop positions;
identify i) a plurality of winning outcomes and ii) a plurality of non-winning outcomes among the outcomes for each of the quantity of free spins stored in the memory device based on the outcome amount associated with the outcome for each of the quantity of free spins;
sort, in ascending order based on the outcome amount for each of the plurality of winning outcomes, the plurality of winning outcomes in a table stored in the memory device;
control the presentation device to display the plurality of winning outcomes in order retrieved from the table stored in the memory device; and
control the presentation device to display the at least one additional free play outcome when the corresponding outcome amount associated with the at least one additional free play outcome is equal to or greater than the respective free play outcome of the plurality of winning outcomes.

3. A gaming machine comprising:
a cabinet;
an input device supported by the cabinet, the input device includes one or more of at least one button and a touch screen display device;
a presentation device supported by the cabinet; and
a game controller enclosed within the cabinet and including a processor and a non-transitory memory device, the non-transitory memory device storing instructions, which when executed by the processor, cause the game controller to at least:
determine a plurality of reel stop positions for a plurality of reels;
cause the plurality of reels to spin and stop at positions that correspond to the plurality of reel stop positions;
determine a base outcome, the base outcome comprising a plurality of symbols displayed by the plurality of reels when stopped;
determine that the base outcome is associated with a predetermined symbol combination;
in response to the base outcome being associated with the predetermined symbol combination, initiate a bonus display sequence via the presentation device, the bonus display sequence comprising a plurality of bonus outcomes;

prior to displaying any of the plurality of bonus outcomes:
determine a quantity of free spins;
determine an outcome for each of the quantity of free spins, the outcome for each of the quantity of free spins including an outcome amount and free-spin reel stop positions;
store the outcome, including the outcome amount and the free-spin reel stop positions, for each of the quantity of free spins in the non-transitory memory device;
determine at least one additional free play outcome, the at least one additional free play outcome including a corresponding outcome amount and additional reel stop positions;
identify i) a plurality of winning outcomes and ii) a plurality of non-winning outcomes among the outcomes for each of the quantity of free spins stored in the non-transitory memory device based on the outcome amount associated with the outcome for each of the quantity of free spins;
sort, in ascending order based on the outcome amount for each of the plurality of winning outcomes, the plurality of winning outcomes in a table stored in a memory;
control the presentation device to display the plurality of winning outcomes in order retrieved from the table stored in the memory; and
control the presentation device to display the at least one additional free play outcome when the corresponding outcome amount associated with the at least one additional free play outcome is equal to or greater than the respective free play outcome of the plurality of winning outcomes.

4. The gaming machine of claim 3, wherein the instructions that cause the game controller to determine the plurality of reel stop positions for the plurality of reels further cause the game controller to determine, using a random number generator, the plurality of reel stop positions, where each reel stop position of the plurality of reel stop positions is based on a random number generated by the random number generator.

5. The gaming machine of claim 3, wherein the instructions that cause the game controller to determine the plurality of reel stop positions for the plurality of reels is based on an outcome of a bingo game.

6. The gaming machine of claim 3, wherein the instructions that cause the presentation device to display the plurality of winning outcomes further cause the game controller to, for each of the plurality of winning outcomes, determine the free-spin reel stop positions for a plurality of reels used for the bonus display sequence.

7. The gaming machine of claim 6, wherein the instructions that cause the game controller to, for each of the plurality of winning outcomes, determine the free-spin reel stop positions for the plurality of reels used for the bonus display sequence further cause the game controller to determine the free-spin reel stop positions for the plurality of reels used for the bonus display sequence based on an outcome of a random number generator.

8. The gaming machine of claim 6, wherein the instructions that cause the game controller to, for each of the plurality of winning outcomes, determine the free-spin reel stop positions for the plurality of reels used for the bonus display sequence further cause the game controller to determine the free-spin reel stop positions for the plurality of reels used for the bonus display sequence based on an outcome of a bingo game.

9. The gaming machine of claim 3, wherein the instructions that cause the game controller to identify the plurality of winning outcomes among the outcomes for each of the quantity of free spins stored in the non-transitory memory device based on the outcome amount associated with the outcome for each of the quantity of free spins further cause the game controller to identify the plurality of winning outcomes based on outcome amounts greater than zero.

10. The gaming machine of claim 3, wherein the instructions that cause the game controller to identify the plurality of non-winning outcomes among the outcomes for each of the quantity of free spins stored in the non-transitory memory device based on the outcome amount associated with the outcome for each of the quantity of free spins further cause the game controller to identify the plurality of non-winning outcomes based on outcome amounts equal to zero.

11. The gaming machine of claim 3, wherein the bonus display sequence includes a red screen background to visually indicate entry into the bonus display sequence.

12. The gaming machine of claim 3, further comprising a communication interface coupled to the game controller, wherein the instructions further cause the game controller to determine that a first free play trigger condition is satisfied by receiving, via the communication interface, a first free play notification from at least one of a gaming server and another gaming machine, wherein the bonus display sequence includes a red screen background to visually indicate entry into the bonus display sequence.

13. The gaming machine of claim 3, wherein the instructions further cause the game controller to:
retrieve a weighted table stored in the non-transitory memory device that includes a plurality of free play quantities and associated weights;
determine a quantity of free plays using the weighted table based on a minimum quantity of free plays, a maximum quantity of free plays, and a random number generated by a random number generator; and
execute the determined quantity of free plays to create a quantity of free play outcomes.

14. The gaming machine in accordance with claim 3, wherein the instructions further cause the game controller to use a first number and a first type of gaming symbols in the plurality of reels that are different from a second number and a second type of gaming symbols in the plurality of reels used in the bonus display sequence.

* * * * *